(12) United States Patent
Radaelli et al.

(10) Patent No.: US 12,546,370 B2
(45) Date of Patent: Feb. 10, 2026

(54) DISC BRAKE CALIPER

(71) Applicant: BREMBO S.p.A., Curno (IT)

(72) Inventors: Marco Radaelli, Curno (IT); Raffaele Milanese, Curno (IT); Andrea Mecocci, Curno (IT); Tomasz Woloszyn, Curno (IT); Alberto Bosis, Curno (IT)

(73) Assignee: Brembo S.p.A., Bergamo (IT)

( * ) Notice: Subject to any disclaimer, the term of this patent is extended or adjusted under 35 U.S.C. 154(b) by 501 days.

(21) Appl. No.: 18/048,185

(22) Filed: Oct. 20, 2022

(65) Prior Publication Data

US 2023/0193964 A1    Jun. 22, 2023

(30) Foreign Application Priority Data

Oct. 21, 2021   (IT) .................... 102021000027077

(51) Int. Cl.
*F16D 55/226*    (2006.01)
*F16D 55/00*    (2006.01)

(52) U.S. Cl.
CPC .... *F16D 55/226* (2013.01); *F16D 2055/0016* (2013.01)

(58) Field of Classification Search
CPC ......................... F16D 55/226; F16D 2055/0016
USPC ....... 188/72.6–72.8, 156–164; 277/434, 438, 277/540, 589, 650
See application file for complete search history.

(56) References Cited

U.S. PATENT DOCUMENTS

| 6,056,292 | A | * | 5/2000 | Gerigk | .................. | F16J 15/324 |
| | | | | | | 277/560 |
| 6,523,833 | B1 | | 2/2003 | Ishigaki et al. | | |
| 6,651,784 | B1 | * | 11/2003 | Barbosa | ................ | F16D 65/567 |
| | | | | | | 188/71.9 |
| 10,982,728 | B2 | * | 4/2021 | Klaas | ...................... | F16D 65/18 |
| 2004/0164496 | A1 | * | 8/2004 | Okada | .................. | F02M 59/442 |
| | | | | | | 277/549 |

(Continued)

FOREIGN PATENT DOCUMENTS

| EP | 2191160 A1 | 6/2010 |
| EP | 2273149 A1 | 1/2011 |

OTHER PUBLICATIONS

Search Report for IT 2021000027077 dated Jun. 3, 2022, Munich, DE.

*Primary Examiner* — Christopher P Schwartz

(74) *Attorney, Agent, or Firm* — Marshall & Melhorn, LLC

(57) ABSTRACT

A disc brake caliper has a caliper body arranged straddling a brake disc having a rotation axis defining an axial direction and opposite friction surfaces, pads accommodated in the caliper body, a cylinder forming a cylindrical wall and a bottom wall, a piston, and a parking-braking system having a rotating member accommodated within a rotation housing formed in the bottom wall. The cylinder defines a first annular housing and a second annular housing both made in the bottom wall, and extending in a direction transverse to the axial direction and leading into the rotation housing. The second annular housing is distinct from the first annular housing and positioned in a direction opposite to an inner surface of the bottom wall. The first annular housing accommodates a first seal. The second annular housing accommodates a second seal. The first and second seals act between the rotating member and the bottom wall.

23 Claims, 6 Drawing Sheets

(56) References Cited

U.S. PATENT DOCUMENTS

2004/0245055 A1   12/2004  Gerard et al.
2013/0037357 A1    2/2013  Cornolti et al.
2017/0369047 A1*  12/2017  Okada .................. B60T 13/686
2019/0154156 A1*   5/2019  Sakakura ................ F04D 29/12
2019/0383336 A1*  12/2019  Noguchi ............... F16D 55/226

* cited by examiner

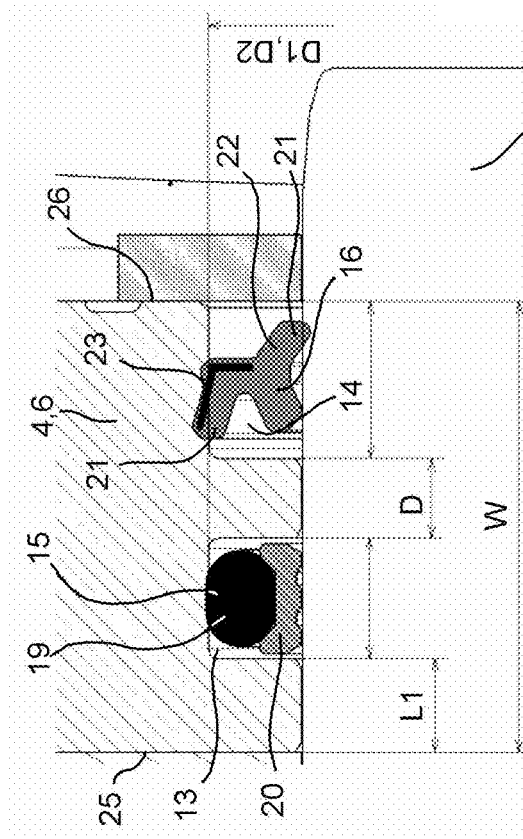
FIG. 13
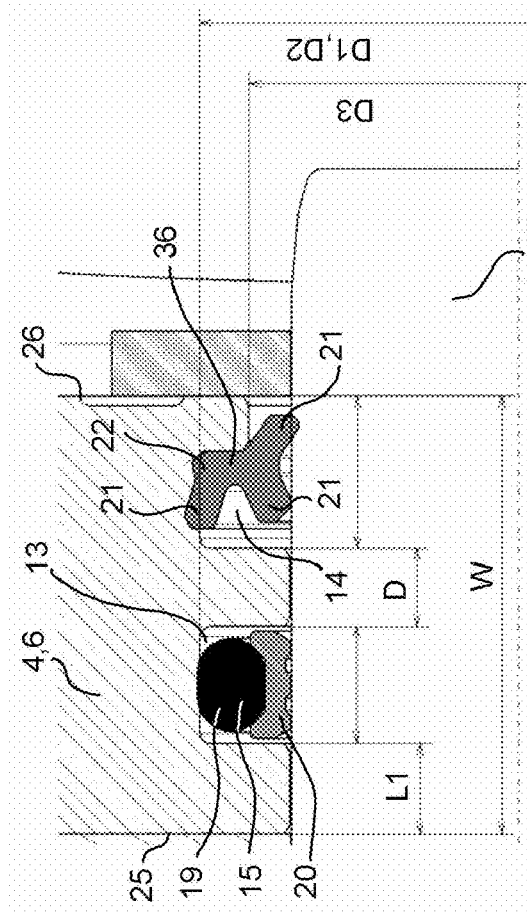
FIG. 14
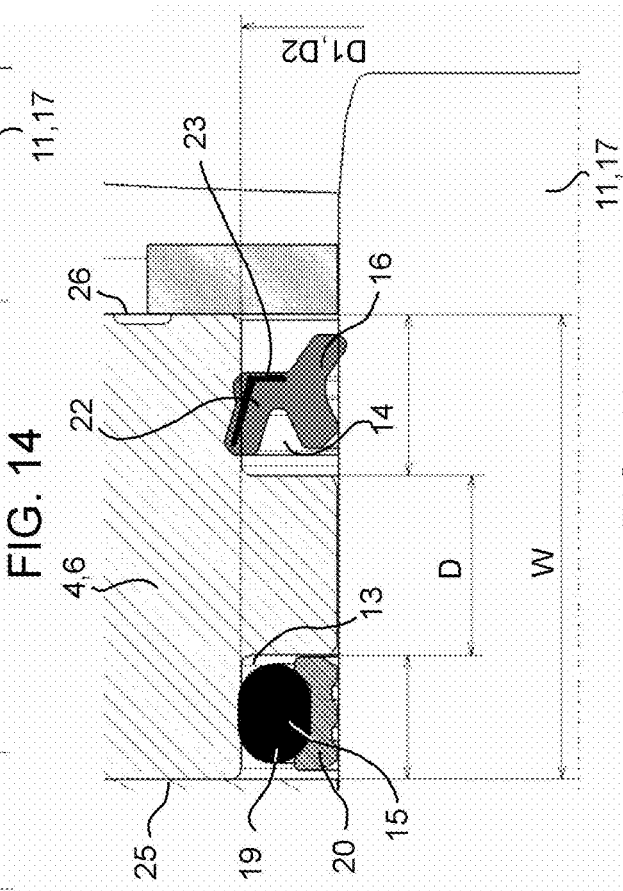
FIG. 15
FIG. 16

DISC BRAKE CALIPER

CROSS-REFERENCE TO RELATED APPLICATION

This application claims priority to Italian Patent Application No. 102021000027077 filed on Oct. 21, 2021, the contents of which are incorporated by reference in their entirety.

FIELD OF THE INVENTION

The present invention relates to a disc brake caliper, in particular to a disc brake comprising an electromechanical parking brake.

BACKGROUND OF THE INVENTION

In recent years, the development of electromechanical parking brakes (EPBs) has focused on increasing their parking performance, both in terms of the generated clamping force and service life.

In particular, the current EPB devices are required to sustain at least 200,000 load cycles.

It has been observed that a correct fluid sealing of the braking system plays a key role in increasing the service life of an EPB device, and thus its number of load cycles.

Undesired brake fluid leakage and undesired air ingress from outside cause the deterioration of the EPB devices.

Indeed, in the absence of correct sealing, the braking fluid may enter the ratio motor chamber of the EPB device and damage its operation, causing plastic gears to swell or the motor to short-circuit.

Additionally, due to the loss of optimal sealing, the resulting brake fluid oozing generates a vicious cycle that further reduces the life of EPB devices.

To address these critical issues, the current EPB devices are generally provided with a seal consisting of an O-ring coupled with a backup ring/anti-extrusion ring configured to prevent extrusion of the O-ring rubber, which can be generated by high brake fluid pressures.

This known solution is not optimal because the resulting fluid sealing is highly dependent on the compression of the O-ring within the housing in which it is accommodated.

Furthermore, since the O-ring is mounted directly on the screw shaft of the EPB device, the relative creep and heat generated during the handling of the screw cause severe wear and abrasion of the O-ring. The O-ring wear generates a significant reduction in its own compression, causing brake fluid leakage and reducing caliper life.

A further problem caused by O-ring wear and its associated loss of compression is the ingress of air during brake actuation without the presence of pressurized brake fluid.

Indeed, implementing the brake without the application of pressurized fluid causes the movement of the brake piston to generate negative pressure at the EPB screw.

In the presence of a worn sealing system, the negative pressure causes air to be sucked in from the outside, and causes a spongy feel to the pedal, reducing braking performance.

It has been attempted to solve these critical issues and increase the tightness of the system by placing multiple O-rings side by side.

However, placing multiple O-rings within the same housing has not been shown to be decisive because it does not solve the critical issues related to high braking fluid pressures acting on the plurality of O-rings, which determine the oozing of braking fluid past the plurality of juxtaposed O-rings.

US2013037357A1 describes a disc brake caliper in which a dual-stage sealing is applied to a service brake translating member (the piston). One of the two sealing stages comprises a square cross-section seal, configured to be compressed in the axial direction and easily deformable to provide the piston with a "roll-back" effect. This known solution, although suitable for application to a translating member, is not adapted to ensure a correct sealing to a rotating member of a parking brake system because the rotation of the rotating member would exacerbate the deformation of the seal, which would then be unable to effectively prevent the oozing of brake fluid.

EP2273149A1 also describes a disc brake caliper in which a dual-stage sealing is applied to a service brake translating member (i.e. the piston). One of the two sealing stages comprises a seal configured to act initially in an integral manner with the translating member. This known solution is not applicable to a rotating member because an adhesion with the rotating member would quickly damage the seal and its sealing ability.

SUMMARY OF THE INVENTION

It is the object of the present invention to provide a caliper for disc brake, comprising an improved parking braking system and configured to solve at least some of the drawbacks of the background art.

These and other objects are obtained by a disc brake caliper as described and claimed herein.

Preferred and advantageous embodiments of the present invention are also described.

BRIEF DESCRIPTION OF THE DRAWINGS

In order to better understand the present invention and appreciate the advantages thereof, some non-limiting exemplary embodiments thereof will be described hereinbelow with reference to the accompanying drawings, in which:

FIG. 13 is a front view of a component of a caliper for a disc brake along an axial section according to a further embodiment of the present invention;

FIG. 14 is a front view of a component of a caliper for a disc brake along an axial section according to a further embodiment of the present invention;

FIG. 15 is a front view of a component of a caliper for a disc brake along an axial section according to a further embodiment of the present invention; and FIG. 16 is a front view of a component of a caliper for a disc brake along an axial section according to a further embodiment of the present invention.

DETAILED DESCRIPTION

Figure 1:
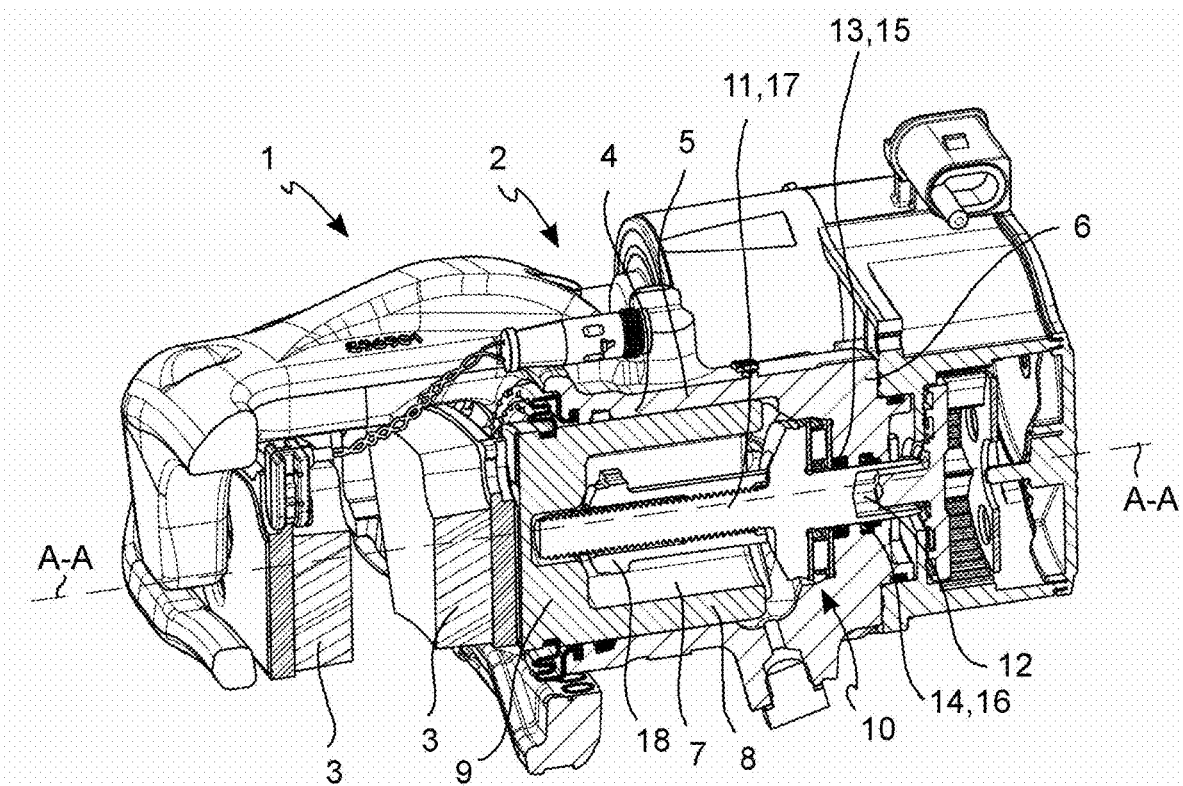
FIG. 1 is a perspective view of a caliper for a disc brake taken along an axial section according to an embodiment of the present invention.
Figure 2:
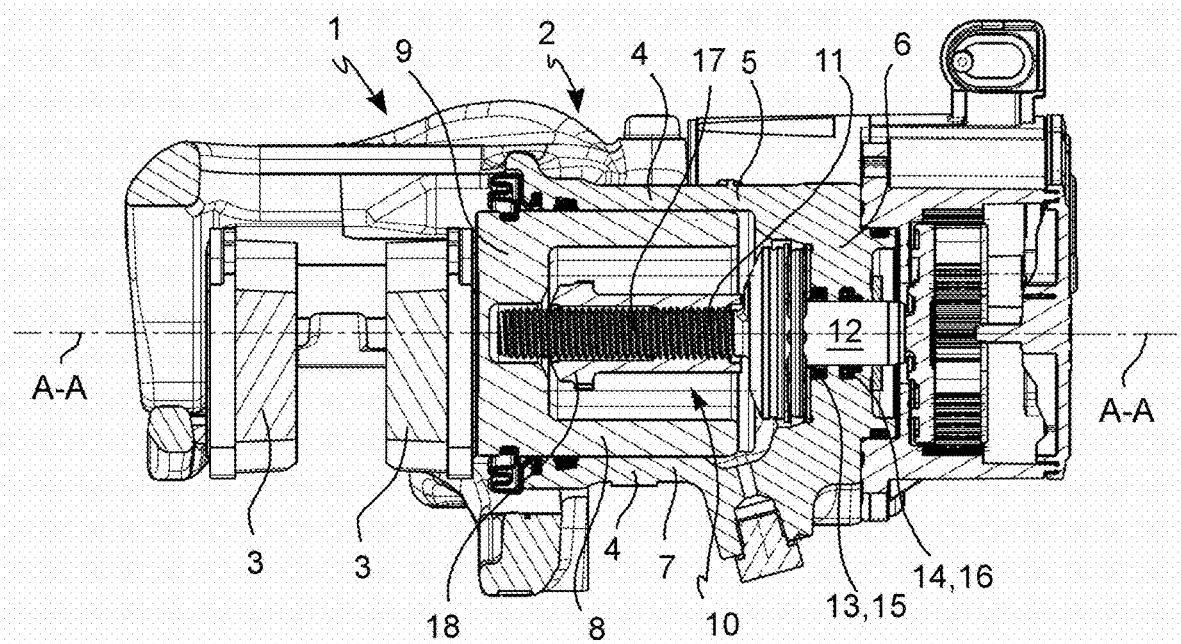
FIG. 2 is a side view of the caliper for a disc brake shown in FIG. 1.
Figure 3:
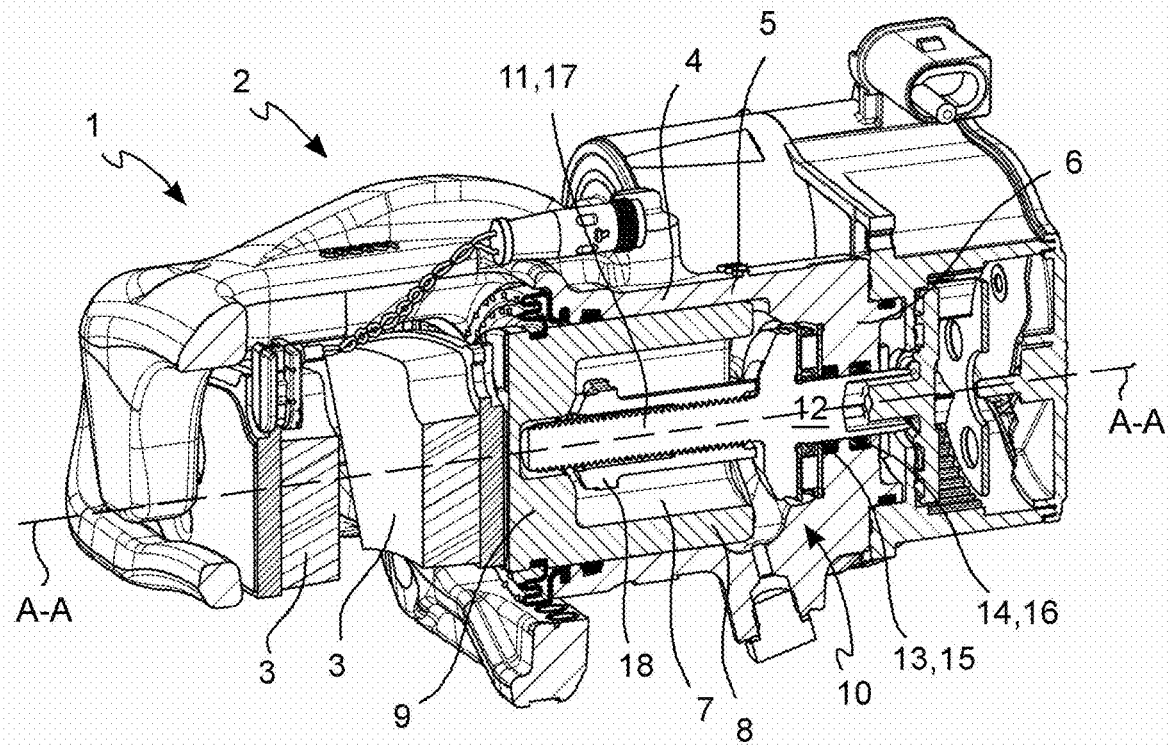
FIG. 3 is a perspective view of a caliper for a disc brake taken along an axial section according to an embodiment of the present invention.
Figure 4:
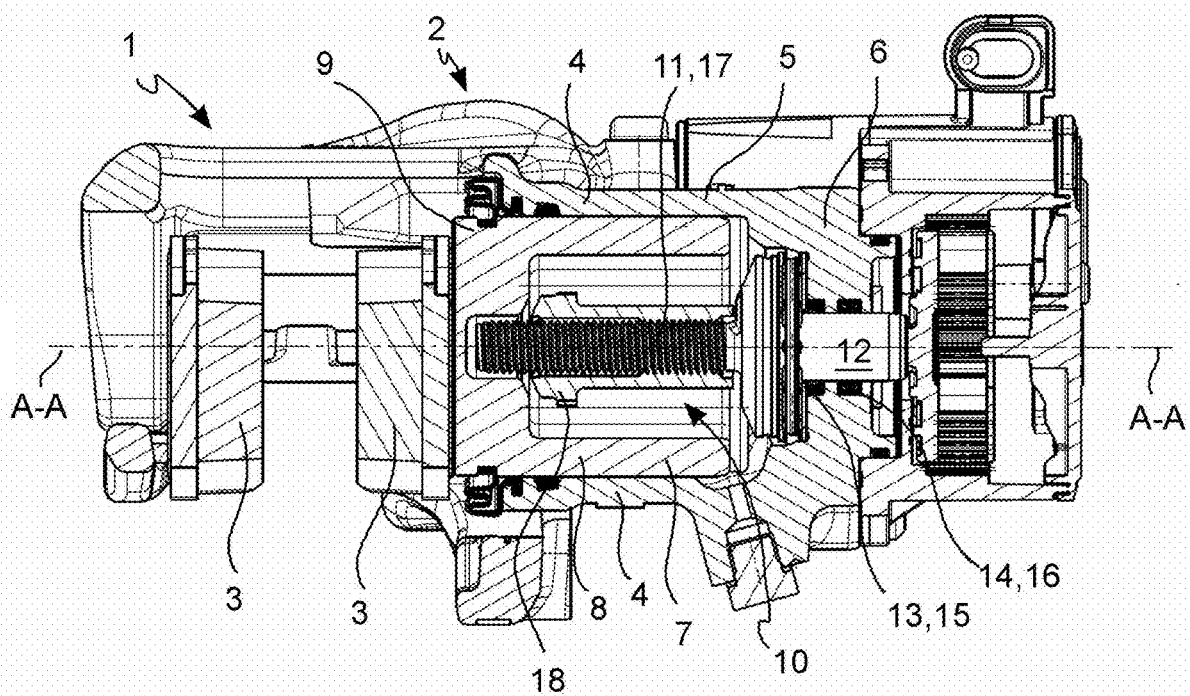
FIG. 4 is a side view of the caliper for a disc brake shown in FIG. 3.
Figure 5:
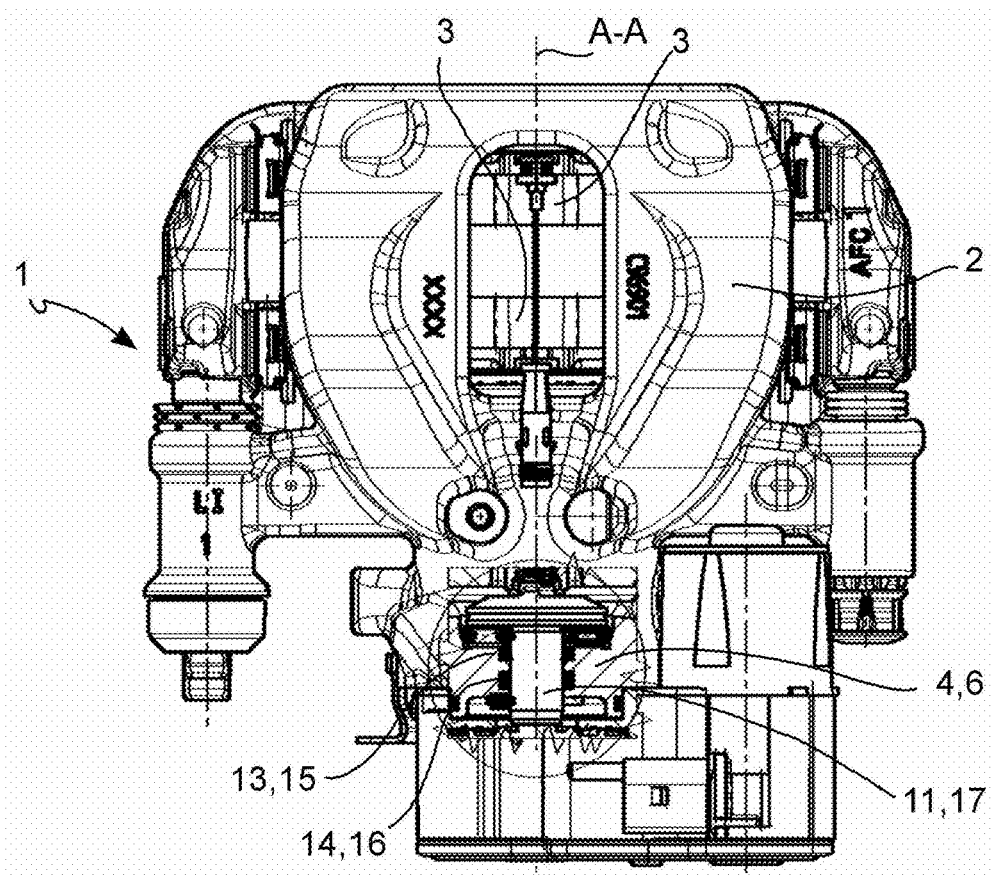
FIG. 5 is a partially sectioned upper perspective view of a caliper for a disc brake according to an embodiment of the present invention.
Figure 6:
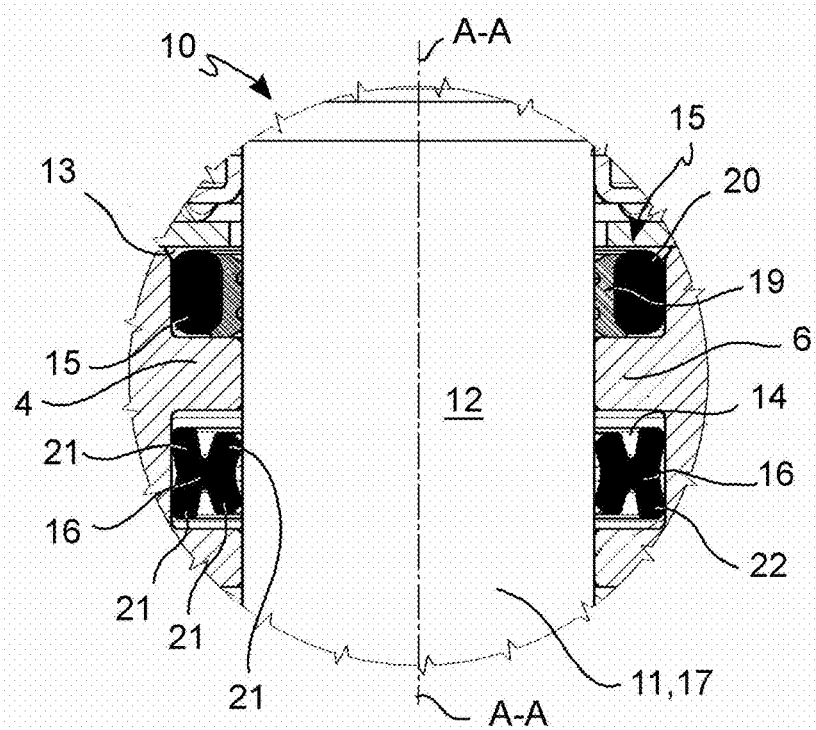
FIG. 6 is a detail view of a part of FIG. 5.
Figure 7:
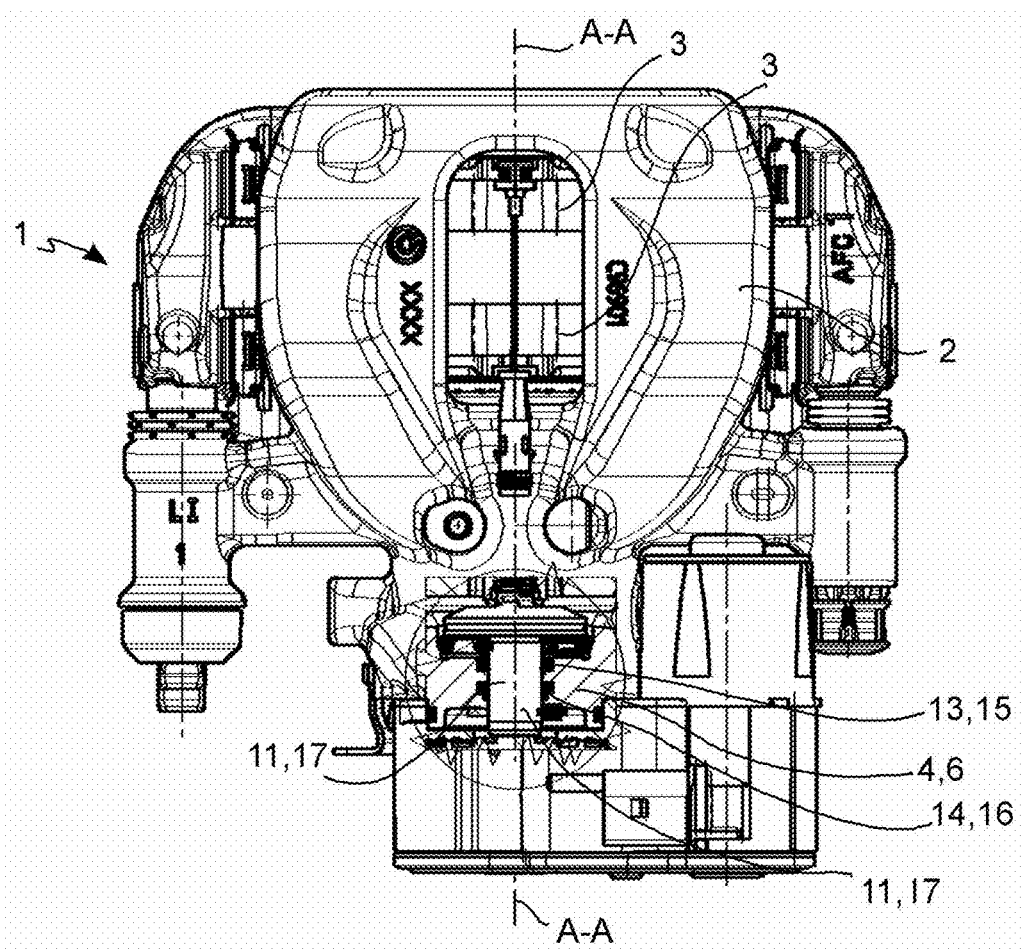
FIG. 7 is a partially sectioned upper view of a caliper for a disc brake according to a further embodiment of the present invention.
Figure 8:
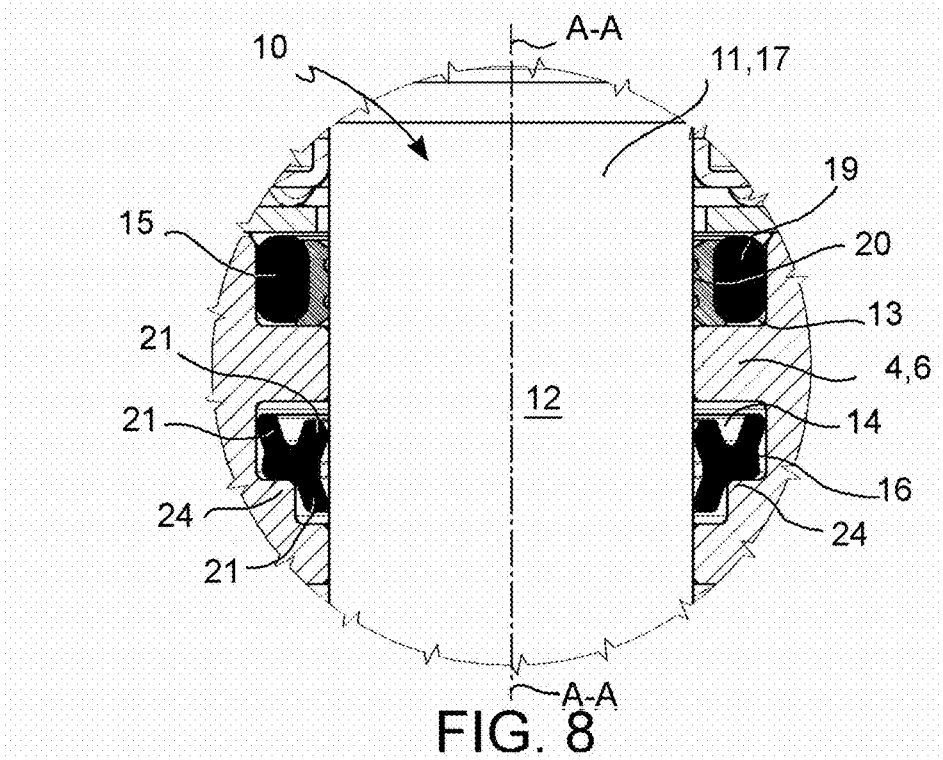
FIG. 8 is a detail view of a part of FIG. 7.
Figure 9:
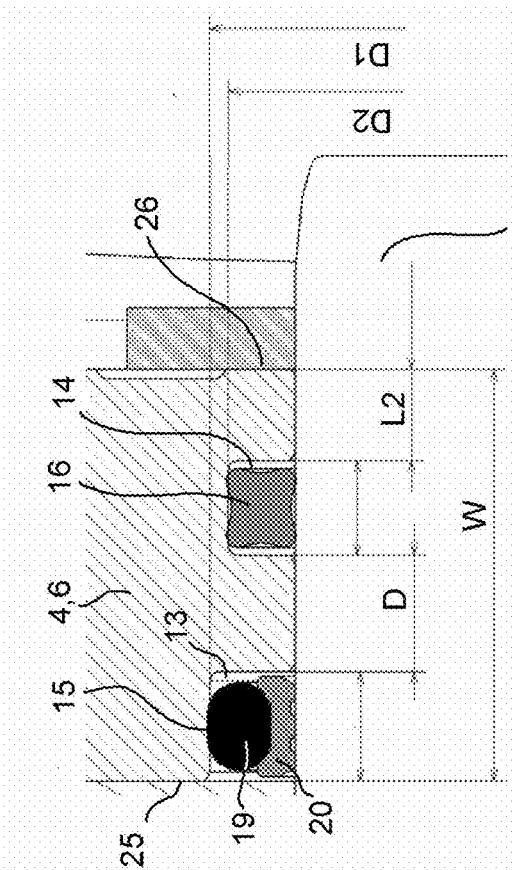
FIG. 9 is a front view of a component of a caliper for a disc brake along an axial section according to an embodiment of the present invention.
Figure 10:
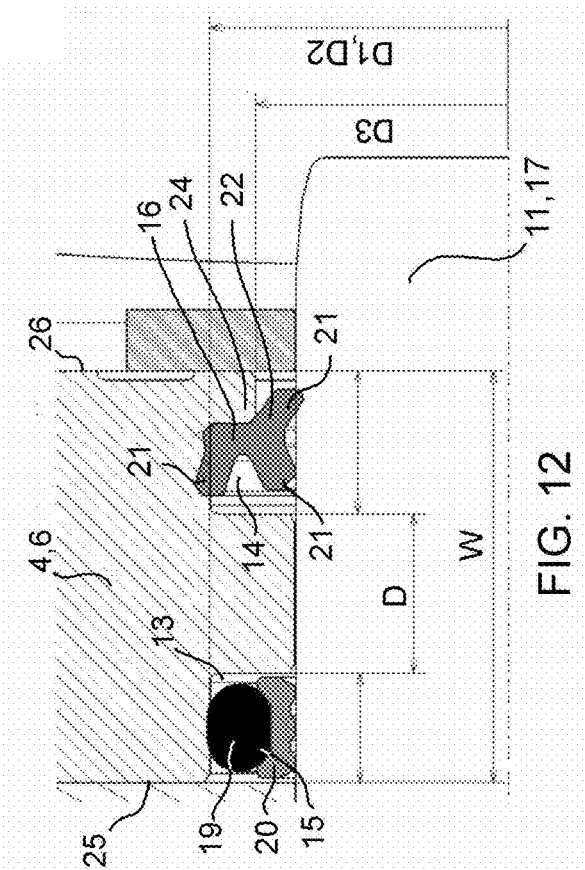
FIG. 10 is a front view of a component of a caliper for a disc brake along an axial section according to a further embodiment of the present invention.
Figure 11:
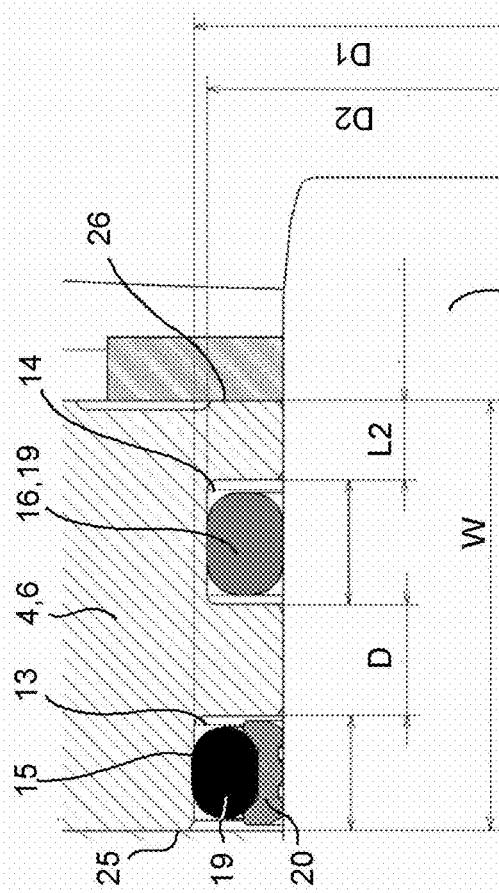
FIG. 11 is a front view of a component of a caliper for a disc brake along an axial section according to a further embodiment of the present invention.
Figure 12:
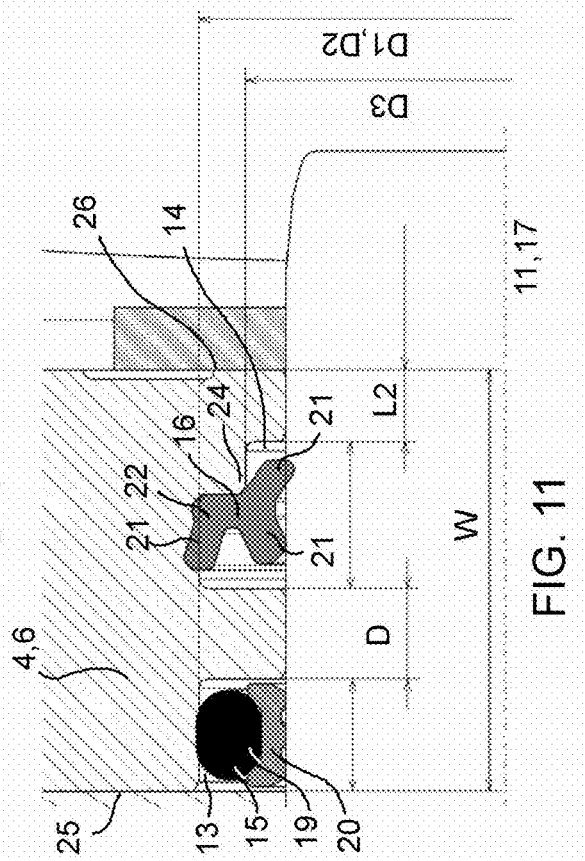
FIG. 12 is a front view of a component of a caliper for a disc brake along an axial section according to a further embodiment of the present invention.

With reference to the figures, a disc brake caliper is generally indicated by reference numeral 1.

The disc brake caliper 1 comprises a caliper body 2 arranged straddling a brake disc having a rotation axis, which defines an axial direction A-A and opposite friction surfaces.

The disc brake caliper 1 comprises pads 3 accommodated in the caliper body 2 so as to slide substantially in an axial direction A-A with respect to the brake disc to act respectively on the opposite friction surfaces.

Furthermore, the disc brake caliper 1 comprises a cylinder 4, which forms a cylindrical wall 5 and a bottom wall 6 transverse to the cylindrical wall 5.

The disc brake caliper 1 further comprises a piston 7, which forms a side wall 8 and a thrust wall 9 substantially transverse to the side wall 8 and opposite to the bottom wall 6 of the cylinder 4.

The bottom wall 6 forms an inner surface 25 facing towards the piston 7 and an opposite outer surface 26 facing opposite to the piston 7.

The piston 7 is accommodated within the cylinder 4, and the side wall 8 of the piston 7 is adapted to slide within the cylindrical wall 5 of the cylinder 4.

The piston 7 is configured to be biased by a pressurized brake fluid injectable within the cylinder 4, to bias at least one of the pads 3 against one of the brake disc friction surfaces, along a thrust direction substantially parallel to the axial direction A-A.

The disc brake caliper 1 further comprises a parking-braking system 10 which comprises a rotating member 11.

The rotating member 11 is rotatably accommodated within a rotation housing 12 formed in the bottom wall 6 of the cylinder 4 so that the rotating member 11 is rotatable about a rotation axis substantially parallel to the axial direction A-A.

According to an aspect of the present invention, the cylinder 4 defines a first annular housing 13 and a second annular housing 14 made in the bottom wall 6.

The first and second annular housings 13, 14 extend into the bottom wall 6 in a direction transverse to the axial direction A-A and leading into the rotation housing 12.

The second annular housing 14 is distinct from the first annular housing 13 and is positioned in a direction opposite to the inner surface 25 of the bottom wall 6 with respect to the first annular housing 13.

The first annular housing 13 accommodates a first seal 15, and the second annular housing 14 accommodates a second seal 16.

The first and second seals 15, 16 are configured to act between the rotating member 11 and the bottom wall 6 of the cylinder 4 to be fluid-tight.

Advantageously, the first and second seals 15, 16 provide high sealing and drastically reduce unwanted brake fluid leakage and air ingress from outside.

Specifically, the first seal 15, closest to the pressurized brake fluid, shields the pressure and provides most of the sealing. The second seal 16 makes it possible to stop droplets of braking fluid from oozing past the first seal 15, thus achieving a high sealing.

According to an embodiment, the parking braking system 10 comprises a screw-nut system formed by a screw 17 and a nut 18.

A rotation of the screw 17 corresponds to a translation of the nut 18, relative to the caliper body 2, along a direction parallel to the axial direction A-A.

The nut 18 is configured to bias at least one of the pads 3 against one of the friction surfaces of the brake disc.

The rotating member 11 constitutes the screw 17.

Optionally, the screw-nut system defines a thread of irreversible type.

Advantageously, such configuration drastically reduces the oozing of braking fluid past the screw 17, preserving correct operation of additional components of the EPB device.

According to an embodiment, the first seal 15 comprises an O-ring 19 coupled with a sealing ring that also has the backup function and will be called backup ring 20 hereinafter.

The backup ring 20 is interposed between the O-ring 19 and the rotating member 11 and is made of less deformable material than the material of the O-ring 19.

Optionally, the backup ring 20 is made of polymeric material, such as polytetrafluoroethylene (PTFE), or polymeric material with PTFE filler in the polymer matrix.

Advantageously, the configuration of the first seal 15 avoids relative rotations between the O-ring 19 and the screw 17, which occur between the screw 17 and the backup ring 20, instead. In this manner, the O-ring 19 works as subjected to static and not dynamic conditions allowing a significant reduction in wear cross-sectional area (or chord) of the O-ring.

According to an embodiment, the second seal 16 is a scraper.

Advantageously, the scraper ensures a high sealing against brake fluid oozing, dust and rust ingress, or air leakage from outside, achieving a high fluid sealing in synergy with the first seal 15.

Further advantageously, the scraper makes up for any wear, and consequent reduction in tightness, of the backup ring 20 of the first seal 15, thereby continuing to preserve the tightness of the entire braking system.

According to an embodiment, the second seal 16 is:
an O-ring; or
an X-ring; or
a symmetrical or asymmetrical lip seal; or
a lip seal, symmetrical or asymmetrical, incorporating a reinforcing insert 23, made of metallic or polymeric material; or
a lip seal defining three lobes 21 in a section parallel to the axial direction A-A; or
a lip seal defining four lobes 21 in a section parallel to the axial direction A-A.

Advantageously, the scrapers thus configured make up for any deviations in geometric tolerances, due to temperature variations, for example, to preserve proper sealing of the braking system.

According to an embodiment, the second seal 16 is a lip seal that defines a three-lobe profile 21 in a section parallel to the axial direction A-A.

Two of the three lobes 21 are biased against the rotating member 11 and one of the three lobes 21 is biased against the bottom wall 6 of the cylinder 4.

Optionally, two of the three lobes 21 are pinned against the rotating member 11 opposite each other along a direction parallel to the axial direction A-A.

Optionally, one of the three lobes 21 biased against the bottom wall 6 of the cylinder 4 is pinned against the bottom wall 6 in the direction of the inner surface 25 of the bottom wall 6.

Optionally, the second seal 16 is a lip seal that defines a four-lobe profile 21 in a section parallel to the axial direction A-A, and in which two of the four lobes 21 are biased against the rotating member 11 and two opposite lobes 21 are biased against the bottom wall 6 of the cylinder 4.

Optionally, two of the four lobes 21 are pinned against the rotating member 11 opposite each other along a direction parallel to the axial direction A-A, and two opposite lobes 21 are pinned against the bottom wall 6 opposite each other along a direction parallel to the axial direction A-A.

According to an embodiment, the second seal 16 comprises a seal body 22 made of polymeric material, and a reinforcing insert 23, preferably metal, incorporated within the seal body 22.

The reinforcing insert 23 is configured to promote gripping of the second seal 16 to the bottom wall 6.

Optionally, the second seal 16 defines a three-lobe profile 21 in a section parallel to the axial direction A-A, in which one of the three lobes 21 is biased against the bottom wall 6 of the cylinder 4, and in which the reinforcing insert 23 is incorporated within the lobe 21.

Advantageously, the reinforcing insert 23 is configured to prevent elastic deformation of the lobe 21.

According to an embodiment, the second annular housing 14 defines a concave polygon-shaped profile in a section parallel to the axial direction A-A.

Optionally, the concave polygon has at least one concave angle of about 270°.

Optionally, the second seal 16 accommodated by the second annular housing 14 is an asymmetrical lip seal.

According to an embodiment, the bottom wall 6 of the cylinder 4 forms, at the second annular housing 14, at least one backing step 24 that determines the concave polygon-shaped profile of the second annular housing 14 in a section parallel to the axial direction A-A.

The second seal 16 defines a three-lobe profile 21 or four-lobe profile 21 in the section parallel to the axial direction A-A.

At least one lobe 21 of the second seal 16 is positioned abutting against the at least one backing step 24.

According to an embodiment, between the first annular housing 13 and the second annular housing 14, along a section parallel to the axial direction A-A, the bottom wall 6 of the cylinder 4 defines a distance D comprised between:
2.0 mm and 6.0 mm; or
2.4 mm and 5.2 mm; or
2.9 mm and 3.8 mm.

Advantageously, the distance D strengthens the inner surface 25 of the bottom wall 6, which is biased by pressure of the braking fluid.

According to an embodiment, the first annular housing 13 leads into the inner surface 25 of the bottom wall 6.

Optionally, the second annular housing 14 leads into the outer surface 26 of the bottom wall 6.

Advantageously, when it leads into the outer surface 26 and is free from a backing step 24, a seal incorporating a reinforcing insert 23 may be inserted within the second annular housing 14.

Optionally, between the first annular housing 13 and the inner surface 25, along a section parallel to the axial direction A-A, the bottom wall 6 defines a first distance L1 comprised between:
0.5 mm and 4.0 mm; or
1.0 mm and 3.0 mm; or
equal to 2.8 mm.

Optionally, between the second annular housing 14 and the outer surface 26, along a section parallel to the axial direction A-A, the bottom wall 6 defines a second distance L2 comprised between:
0.5 mm and 4.0 mm; or
1.0 mm and 3.0 mm; or
equal to 2.3 mm; or
equal to 2.5 mm.

Optionally, along a section parallel to the axial direction A-A, the first annular housing 13 has a length comprised between:
3.0 mm and 4.0 mm; or
equal to 3.6 mm.

Optionally, along a section parallel to the axial direction A-A, the second annular housing 14 has a length comprised between:
2.5 mm and 5.0 mm; or
equal to 3.1 mm; or
equal to 3.9 mm; or
equal to 4.7 mm.

Optionally, along a section transverse to the axial direction A-A, the first annular housing 13 defines a first diameter D1 relative to the rotational axis of the rotating member 11 comprised between:
18.0 mm and 21.0 mm; or
equal to 19.6 mm.

Optionally, along a section transverse to the axial direction A-A, the second annular housing 14 defines a second diameter D2 relative to the rotational axis of the rotating member 11 comprised between:
16.0 mm and 20.0 mm; or
equal to 16.6 mm; or
equal to 18.6 mm;
equal to 19.6 mm.

Optionally, at the second annular housing 14, the bottom wall 6 of the cylinder 4 forms at least one backing step 24 that defines, along a cross-sectional section of the axial direction A-A, a third diameter D3 relative to the rotation axis of the rotating member 11 comprised between:
15.0 mm and 18.0 mm; or
16.0 mm and 17.0 mm; or
equal to 16.6 mm.

Optionally, along a section parallel to the axial direction A-A, the bottom wall 6 of the cylinder 4 defines a thickness W between the inner surface 25 and the outer surface 26 comprised between:
12.0 mm and 14.0 mm; or
equal to 13.5 mm.

Obviously, a person skilled in the art will be able to make changes or adaptations to the present invention, without however departing from the scope of protection as described and claimed herein.

What is claimed is:

1. A disc brake caliper comprising a caliper body arranged straddling a brake disc having a rotation axis defining an axial direction (A-A) and opposite friction surfaces, said disc brake caliper further comprising pads accommodated in the caliper body so as to slide in the axial direction (A-A) with respect to the brake disc to act respectively on the opposite friction surfaces, the disc brake caliper further comprising:
   a cylinder, forming a cylindrical wall and a bottom wall transverse to the cylindrical wall;
   a piston, forming a side wall and a thrust wall transverse to the side wall and opposite to the bottom wall of the cylinder,
   wherein the bottom wall forms an inner surface facing towards the piston and an outer surface facing opposite to the piston,
   wherein the piston is accommodated within the cylinder, and the side wall of the piston is configured to slide within the cylindrical wall of the cylinder,
   wherein the piston is further configured to be biased by a pressurized brake fluid injectable within the cylinder, to affect at least one of the pads against one of the friction surfaces, along a thrust direction substantially parallel to the axial direction (A-A), said disc brake caliper further comprising a parking-braking system that comprises a rotating member, the rotating member being rotatably accommodated about a rotation housing formed in the bottom wall of the cylinder so that the rotating member is rotatable about a rotation axis substantially parallel to the axial direction (A-A), wherein the cylinder defines a first annular housing and a second annular housing made in the bottom wall,
   the first and second annular housings extending into the bottom wall in a direction transverse to the axial direction (A-A) and leading into the rotation housing, the second annular housing being distinct from the first annular housing and being positioned in a direction opposite to the inner surface of the bottom wall with respect to the first annular housing,
   wherein the first annular housing accommodates a first seal, and the second annular housing accommodates a second seal,
   wherein the first seal comprises at least an O-ring and a backup ring, the backup ring being interposed between the rotating member and the O-ring, wherein the backup ring comprises at least one annular groove in an interface where the backup ring abuts the rotating member, and
   wherein the first and second seals are configured to act between the rotating member and the bottom wall of the cylinder to be fluid-tight.

2. The disc brake caliper of claim 1, wherein the second seal is a lip seal that defines a profile with three lobes in a section parallel to the axial direction (A-A), and wherein two of the three lobes are biased against the rotating member and one of the three lobes is biased against the bottom wall of the cylinder.

3. The disc brake caliper of claim 2, wherein two of the three lobes are pinned against the rotating member opposite each other along a direction parallel to the axial direction (A-A).

4. The disc brake caliper of claim 2, wherein one of the three lobes biased against the bottom wall of the cylinder is pinned against the bottom wall in direction of the inner surface of the bottom wall.

5. The disc brake caliper of claim 1, wherein the second annular housing defines a concave polygon-shaped profile in a section parallel to the axial direction (A-A).

6. The disc brake caliper of claim 5,
   wherein the second seal defines a profile with three lobes or a profile with four lobes in the section parallel to the axial direction (A-A), and
   wherein at least one lobe of the second seal is positioned abutting against the at least one backing step.

7. The disc brake caliper of claim 5, wherein the concave polygon has at least one concave angle of about 270°.

8. The disc brake caliper of claim 5, wherein the second seal accommodated by the second annular housing is an asymmetrical lip seal.

9. The disc brake caliper of claim 1, wherein the parking-braking system comprises a screw-nut system formed by a screw and a nut, wherein to a rotation of the screw corresponds a translation of the nut, relative to the caliper body along a direction parallel to the axial direction (A-A), the nut being configured to bias at least one of the pads against one of the friction surfaces of the brake disc,
   wherein the rotating member constitutes the screw.

10. The disc brake caliper of claim 9, wherein the screw-nut system defines a thread, and the thread is of an irreversible type.

11. The disc brake caliper of claim 1, wherein the second seal is one of:
   an O-ring;
   an X-ring;
   a symmetrical or asymmetrical lip seal;
   a lip seal, symmetrical or asymmetrical, incorporating a reinforcing insert;
   a lip seal defining three lobes in a section parallel to the axial direction (A-A); or
   a lip seal defining four lobes in a section parallel to the axial direction (A-A).

12. The disc brake caliper of claim 11, wherein the reinforcing insert is a reinforcing metallic insert.

13. The disc brake caliper of claim 1, wherein the second seal is a lip seal that defines a profile with four lobes in a section parallel to the axial direction (A-A), and wherein two of the four lobes are biased against the rotating member and two opposite lobes are biased against the bottom wall of the cylinder.

14. The disc brake caliper of claim 13, wherein two of the four lobes are pinned against the rotating member opposite each other along a direction parallel to the axial direction (A-A), and two opposite lobes are pinned against the bottom wall opposite each other along a direction parallel to the axial direction (A-A).

15. The disc brake caliper of claim 1, wherein the second seal comprises a seal body in formed from a polymeric material, and a reinforcing insert incorporated within the seal body,
   wherein the reinforcing insert is configured to promote gripping of the second seal onto the bottom wall.

16. The disc brake caliper of claim 15, wherein the second seal defines a profile with three lobes in a section parallel to the axial direction (A-A), wherein one of the three lobes is biased against the bottom wall of the cylinder, wherein the reinforcing insert is incorporated within said lobe and is configured to prevent elastic deformation of said lobe.

17. The disc brake caliper of claim 1, wherein the first seal comprises an O-ring coupled to a backup ring, the backup ring being interposed between the O-ring and the rotating member and being formed of less deformable material with respect to the material constituting the O-ring.

18. The disc brake caliper of claim 1, wherein the second seal is a scraper.

19. The disc brake caliper of claim 1, wherein the first annular housing leads into the inner surface of the bottom wall, the disc brake caliper further comprises at least one of the following features or a combination thereof:
the second annular housing leads into the outer surface of the bottom wall;
between the first annular housing and the inner surface, along a section parallel to the axial direction (A-A), the bottom wall defines a first distance comprised between:
0.5 mm and 4.0 mm,
between the second annular housing and the outer surface, along a section parallel to the axial direction (A-A), the bottom wall defines a second distance comprised between:
0.5 mm and 4.0 mm,
along the section parallel to the axial direction (A-A), the first annular housing has a length comprised between:
3.0 mm and 4.0 mm,
along the section parallel to the axial direction (A-A), the second annular housing has a length comprised between:
2.5 mm and 5.0 mm,
along a section transverse to the axial direction (A-A), the first annular housing defines a first diameter relative to a rotation axis of the rotating member comprised between:
18.0 mm and 21.0 mm,
along a section transverse to the axial direction (A-A), the second annular housing defines a second diameter relative to the rotation axis of the rotating member comprised between:
16.0 mm and 20.0 mm,
at the second annular housing, the bottom wall of the cylinder forms at least one backing step that defines, along a cross-sectional section of the axial direction (A-A), a third diameter relative to the rotation axis of the rotating member comprised between:
15.0 mm and 18.0 mm;
along the section parallel to the axial direction (A-A); the bottom wall of the cylinder defines a thickness between the inner surface and the outer surface comprised between:
12.0 mm and 14.0 mm.

20. The disc brake caliper of claim 1, wherein between the first annular housing and the second annular housing, along a section parallel to the axial direction (A-A), the bottom wall of the cylinder defines a distance comprised between:
2.0 mm and 6.0 mm.

21. A disc brake caliper comprising:
a caliper body arranged to straddle a brake disc having a rotation axis defining an axial direction (A-A) and opposite friction surfaces;
a cylinder having a cylindrical wall and a bottom wall transverse to the cylindrical wall;
a piston accommodated within the cylinder and configured to slide in the axial direction (A-A);
a rotating member being rotatably accommodated about a rotation housing formed in the bottom wall of the cylinder, wherein the cylinder defines a first annular housing extending transversely to the axial direction (A-A) and leading into the rotation housing, wherein a first seal is disposed in the first annular housing, the first seal comprising at least an O-ring and a backup ring, the backup ring being interposed between the rotating member and the O-ring, wherein the backup ring comprises at least one annular groove in the interface where the backup ring abuts the rotating member.

22. The disc brake caliper of claim 21, wherein the backup ring comprises two annular grooves in the interface where the backup ring abuts the rotating member.

23. A disc brake caliper comprising a caliper body arranged straddling a brake disc having a rotation axis defining an axial direction (A-A) and opposite friction surfaces, said disc brake caliper further comprising pads accommodated in the caliper body so as to slide in the axial direction (A-A) with respect to the brake disc to act respectively on the opposite friction surfaces,
the disc brake caliper further comprising:
a cylinder, forming a cylindrical wall and a bottom wall transverse to the cylindrical wall;
a piston, forming a side wall and a thrust wall transverse to the side wall and opposite to the bottom wall of the cylinder,
wherein the bottom wall forms an inner surface facing towards the piston and an outer surface facing opposite to the piston,
wherein the piston is accommodated within the cylinder, and the side wall of the piston is configured to slide within the cylindrical wall of the cylinder,
wherein the piston is further configured to be biased by a pressurized brake fluid injectable within the cylinder, to affect at least one of the pads against one of the friction surfaces, along a thrust direction substantially parallel to the axial direction (A-A), said disc brake caliper further comprising a parking-braking system that comprises a rotating member, the rotating member being rotatably accommodated about a rotation housing formed in the bottom wall of the cylinder so that the rotating member is rotatable about a rotation axis substantially parallel to the axial direction (A-A), wherein the cylinder defines a first annular housing and a second annular housing made in the bottom wall,
the first and second annular housings extending into the bottom wall in a direction transverse to the axial direction (A-A) and leading into the rotation housing,
the second annular housing being distinct from the first annular housing and being positioned in a direction opposite to the inner surface of the bottom wall with respect to the first annular housing,
wherein the bottom wall of the cylinder forms, at a second annular housing, at least one backing step that determines a concave polygon-shaped profile of a second annular housing in the section parallel to the axial direction (A-A),
wherein the first annular housing accommodates a first seal, and the second annular housing accommodates a second seal, and
wherein the first and second seals are configured to act between the rotating member and the bottom wall of the cylinder to be fluid-tight.

* * * * *